United States Patent Office 3,682,899
Patented Aug. 8, 1972

3,682,899
1-OXO - 3-BENZAL-THIOCHROMANONE DERIVATIVES AND A PROCESS FOR THE PRODUCTION OF THESE COMPOUNDS
Motohiro Nishio, Kawasaki-shi, Teiichiro Ito, Tokyo, Takemi Koeda, Kawasaki-shi, and Uichi Shibata, Fujisawa-shi, Japan, assignors to Meiji Seika Kaisha, Ltd., Tokyo, Japan
No Drawing. Filed June 20, 1969, Ser. No. 835,236
Int. Cl. C07d 65/14
U.S. Cl. 260—240 F    8 Claims

ABSTRACT OF THE DISCLOSURE 1-oxy-3-benzal-thiochromanone derivatives of the general formula:

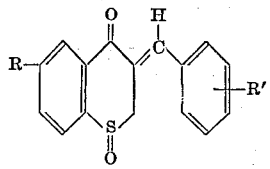

wherein R is a hydrogen atom, a halogen atom or an alkyl group of 1 to 4 carbon atoms; and R' is a hydrogen atom, a halogen atom or a cyano group or a lower alkyl group of 1 to 4 carbon atoms, which are new and useful in inhibiting or suppressing the development of edema and hence have an anti-inflammatory effect, and a process of preparing the above-mentioned 1-oxy-3-benzal-thiochromanone derivatives by oxidizing the corresponding 3-benzal-thiochromanone derivatives.

This invention relates to new and useful compounds, this is, 1-oxy-3-benzal-thiochromanone and its substituted derivatives having pharmaceutical properties, and this invention further relates to a process for the production of these new and useful compounds.

We have now found that substituted or unsubstituted 1-oxy-3-benzal-thiochromanone derivatives of the following general formula:

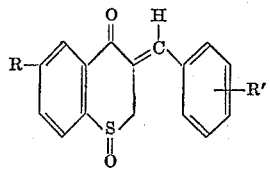

wherein R stands for a hydrogen atom, a halogen atom or an alkyl group of 1 to 4 carbon atoms; and R' stands for a hydrogen atom, a halogen atom, or a cyano group or a lower alkyl group of 1 to 4 carbon atoms are new compounds and that these compounds are appreciably effective in inhibiting or suppressing the development of edema and hence have an anti-inflammatory effect useful to treat an inflammation which occurs in various tissues and organs of animals' and human beings' body.

According to an aspect of the present invention, therefore, we provide, as new and useful compounds, 1-oxy-3-benzal-thiochromanone derivatives of the general formula:

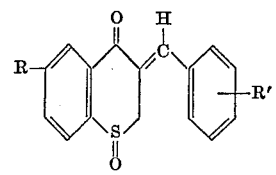

wherein R stands for a hydrogen atom, a halogen atom and preferably chlorine or bromine atom, or an alkyl group of 1 to 4 carbon atoms and preferably methyl group; and R' stands for a hydrogen atom, a halogen atom and preferably chlorine or bromine atom, a cyano group or an alkyl group of 1 to 4 carbon atom and preferably methyl group.

Among the compounds of the present invention, it has been found that 1-oxy-3-benzal-6-chloro-thiochromanone; 1 - oxy - 3-(p-methyl-benzal)-thiochromanone; 1-oxy-3-(o - chloro - benzal)-thiochromanone; 1-oxy-3-(m-chloro-benzal)-thiochromanone and 1-oxy-3-(p-chloro-benzal)-thiochromanone are particularly much effective in inhibiting the edema and are very much useful as antiphlogistic.

According to a preferred embodiment of the present invention, therefore, we provide new substituted 1-oxy-3-benzal-thiochromanone derivatives of the formula:

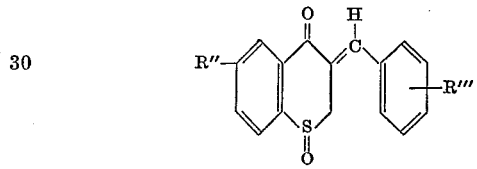

wherein when R'' is a chlorine atom, R''' is a hydrogen atom; and when R'' is a hydrogen atom, R''' is a chlorine atom or a methyl group.

According to another aspect of the present invention, there is provided a method of treating an inflammation in the body of animals and human beings, which comprises administrating an effective dose of an 1-oxy-3-benzal-thiochromanone derivative of the following general formula:

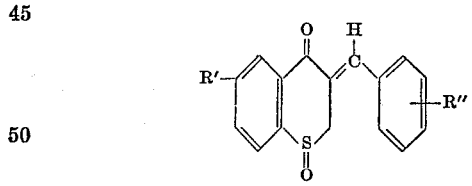

wherein R and R' have the same meanings as defined above.

The substituted or unsubstituted 1-oxy-3-benzalthiochromanone derivatives of the present invention may easily be prepared by oxidizing the corresponding 3-benzal-thiochromanone derivatives with an appropriate oxidizing agent such as hydrogen peroxide.

According to a further aspect of the present invention, therefore, we provide a process for the preparation of 1 - oxy - 3 - benzal-thiochromanone derivatives of the formula:

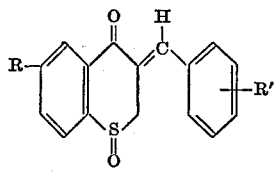

wherein R stands for a hydrogen atom, a halogen atom or an alkyl group of 1 to 4 carbon atoms; and R' stands for a hydrogen atom, a halogen atom, or a cyano group or an alkyl group of 1 to 4 carbon atoms, which comprises oxidizing the corresponding 3-benzal-thiochromanone derivatives.

In carrying out the process of the present invention, the 3-benzal-thiochromanone derivatives used as the starting material may preferably be dissolved or suspended in a suitable inert organic solvent such as acetic acid formic acid or acetone. The oxidation reaction may be effected by using an appropriate oxidant such as hydrogen peroxide, perbenzoic acid or m-chroperbenzoic acid. The reaction may be carried out at various temperatures of up to 35° C. but preferably at ambient temperature. The pressure under which the oxidation is performed is not critical. It is most preferred that the process of the invention should be carried out by mixing and reacting a solution or suspension of the starting material in acetic acid with an equi-molecular or slightly larger amount of hydrogen peroxide in the form of aqueous solution at ambient temperature for several hours with stirring. After completion of the reaction, the 1-oxy-3-benzal-thiochromanone derivative produced may be recovered from the reaction mixture by adding an amount of water to deposit the reaction product which may be filtered off, washed with an appropriate solvent such as acetic acid and then dried. The product may be purified by recrystallization from an appropriate solvent such as ethanol, acetic acid or a mixture thereof with water.

The substituted or unsubstituted 3-benzal-thiochromanone derivatives used as the starting material for the process of the invention may be represented by the formula:

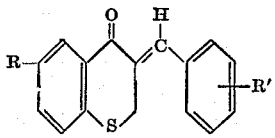

wherein R and R' have the same meaning as defined above. These starting 3-benzal-thiochromanone derivatives may be prepared by condensing a corresponding substituted or unsubstituted thiochromanone of the formula:

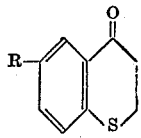

wherein R has the same meaning as defined above, with an excess of a substituted or unsubstituted benzaldehyde of the formula:

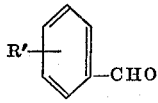

wherein R' also has the same meaning as defined above in the presence of an appropriate catalyst such as hydrogen chloride. This condensation reaction may usually be carried out without using any solvent for the reactants, but an appropriate solvent such as benzene may be used, if desired. The benzaldehyde reactant may preferably be used in slightly excessive amount over the equi-molecular proportion to that of the thiochromanone reagent.

The invention is now illustrated by the following examples to which the present invention is not limited in any way.

EXAMPLE 1

To a suspension of 2.5 g. of 3-benzal-thiochromanone (M.P. 106° C.) in 30 ml. of acetic acid was added slowly 1.5 ml. of 30% aqueous hydrogen peroxide at room temperature with stirring. When the stirring continued at room temperature, the crystals of 3-benzal-thiochromanone were gradually dissolved and the reaction solution slowly became clear. After 5 hours, the solution was clear and colorless, and the reaction was complete. 30 ml. of water was then added to the reaction mixture and the mixture was agitated to deposit 1-oxy-3-benzal-thiochromanone in the form of crystals. This product was filtered off and washed with a mixture of acetic acid and water (1:1) and dried in a desiccator to give 1.7 g. of the product. This product was recrystallized from a mixture of ethanol and water (1:1) to yield a purified product as white-colored needles which had a melting point of 99° C.

Elementary analysis of this product showed:

Calculated for $C_{16}H_{12}O_2S$ (percent): C, 71.6; H, 4.48; S, 11.9. Found (percent): C, 71.28; H, 4.51; S, 12.38.

EXAMPLE 2

To a suspension of 2.9 g. of 3-benzal-6-chloro-thiochromanone (M.P. 124° C.) in 50 ml. of acetic acid was added 1.5 ml. of 30% aqueous hydrogen peroxide at room temperature with stirring. When the stirring continued at room temperature, the crystals were gradually dissolved and the reaction solution slowly became clear. After 6 hours, the reaction solution became clear and colorless. The stirring was further continued, and it was observed that 1 - oxy-3-benzal-6-chloro-thiochromanone slowly deposited. When the reaction had been completed, 20 ml. of water was added to the reaction mixture to complete the precipitation of the product. The resulting precipitate was removed by filtration, washed with acetic acid and then dried in a desiccator to give 2.35 g. of the product. Recrystallization from ethanol gave a pure product in the form of white-colored needles which had a melting point of 175° C.

Elementary analysis of this product showed:

Calculated for $C_{16}H_{11}O_2SCl$ (percent): C, 63.4; H, 3.64. Found (percent): C, 63.5; H, 3.93.

EXAMPLE 3

To a solution of 2.7 g. of 3-benzal-6-methyl-thiochromanone (M.P. 122° C.) in 30 ml. of acetic acid was added 1.5 ml. of 30% aqueous hydrogen peroxide at room temperature with stirring. After 5 hours, 30 ml. of water was added to the resulting clear reaction solution to deposit 1-oxy-3-benzal-6-methyl-thiochromanone. This product was removed by filtration, washed with acetic acid and dried in a desiccator to yield 2.25 g. of the product. Recrystallization from ethanol gave a pure product in the form of white-colored needles which had a melting point of 154° C.

Elementary analysis of this product showed:

Calculated for $C_{17}H_{14}O_2S$ (percent): C, 72.4; H, 4.97; S, 11.4. Found (percent): C, 72.61; H, 5.22; S, 11.57.

EXAMPLE 4

The procedure of Example 3 was repeated using 2.9 g. of 3 - (o-chloro-benzal)-thiochromanone (M.P. 108° C.) There was obtained 2.3 g. of 1 - oxy - 3 - (o-chlorobenzal)-thiochromanone. This product was then recrystallized from ethanol to yield a pure product in the form of colorless prism-like crystals which had a melting point of 128° C.

Elementary analysis of this product showed:

Calculated for $C_{17}H_{14}O_2SCl$ (percent): C, 63.4; H, 3.64. Found (percent): C, 62.95; H, 3.89.

EXAMPLE 5

The procedure of Example 3 was repeated using 2.9 g. of 3-(m-chloro-benzal)-thiochromanone (M.P. 110° C.). There was obtained 2.5 g. of 1-oxy-3-(m-chlorobenzal)-thiochromanone. This product was recrystallized from ethanol to give a pure product in the form of white-colored needles which had a melting point of 143° C.

Elementary analysis of this product showed:

Calculated for $C_{16}H_{11}O_2SCl$ (percent): C, 63.4; H, 3.64. Found (percent): C, 62.98; H, 3.57.

EXAMPLE 6

The procedure of Example 3 was repeated using 2.9 g. of 3 - (p-chloro-benzal)-thiochromanone (M.P. 138° C.). There was obtained 2.25 g. of 1-oxy-3-(p-chlorobenzal)-thiochromanone. This product was then recrystallized from ethanol to give a pure product in the form of white-colored needles which had a melting point of 148° C.

Elementary analysis of this product showed:

Calculated for $C_{16}H_{11}O_2SCl$ (percent): C, 63.4; H, 3.64. Found (percent): C, 63.42; H, 3.72.

EXAMPLE 7

The procedure of Example 3 was repeated using 3.4 g. of 3 - (o-bromo-benzal)-thiochromanone (M.P. 108° C.). There was obtained 2.35 g. of 1-oxy-3-(o-bromobenzal)-thiochromanone. This product in the form of white-colored prism-like crystals which had a melting point of 140° C.

Elementary analysis of this product showed:

Calculated for $C_{16}H_{11}O_2SBr$ (percent): C, 55.4; H, 3.17. Found (percent): C, 56.29; H, 3.24.

EXAMPLE 8

The procedures of Example 3 was repeated using 3.3 g. of 3-(p-bromo-benzal)-thiochromanone (M.P. 134° C.). There was obtained 2.1 g. of 1-oxy-3-(p-bromobenzal)-thiochromanone. Recrystallization of this product from ethanol gave a pure product in the form of white-colored needles which had a melting point of 134° C.

Elementary analysis of this product showed:

Calculated for $C_{16}H_{11}O_2SBr$ (percent): C, 55.4; H, 3.17. Found (percent): C, 54.82; H, 3.29.

EXAMPLE 9

The procedure of Example 3 was repeated except that 2.8 g. of 3-(p-cyano-benzal)-thiochromanone (M.P. 168° C.) was used as the starting material. There was recovered 1.1 g. of 1 - oxy 3 - (p-cyano-benzal)-thiochromanone. Recrystallization from ethanol gave a pure product in the form of lightly yellow-colored, prism-like crystals which had a melting point of 183° C. with decomposition.

Elementary analysis of this product showed:

Calculated for $C_{17}H_{11}NO_2S$ (percent): C, 60.8; H, 3.76; N, 4.78; S, 10.9. Found (percent): C, 62.4; H, 3.97; N, 4.69; S, 11.8.

EXAMPLE 10

The procedure of Example 3 was repeated except that 2.7 g. of 3-(p-methyl-benzal)-thiochromanone (M.P. 115° C.) was used as the starting material. There was obtained 2.3 g. of 1-oxy-3-(p-methyl-benzal)-thiochromanone. Recrystallization of this product from ethanol gave a pure product in the form of colorless needles which had a melting point of 142° C.

Elementary analysis of this product showed:

Calculated for $C_{17}H_{14}O_2S$ (percent): C, 72.4; H, 4.97; S, 11.4%. Found (percent): C, 71.57; H, 4.95; S, 11.26.

EXAMPLE 11

Some of the compounds according to the present invention were tested for their action to inhibit the edema which was caused to occur in hind paw of rat by administration of carrageenin.

The tests were carried out according to Winter's method, using 6 male rats of Donryu strain which had an average body weight of 140–170 g. per rat and of which paw had been swollen by administration of carrageenin. Rats were treated by intraperitoneally injecting 10 ml. of a test compound per rat. After 1 hour later, 0.05 ml. of 1% carrageenin was injected into hind paw of rat.

The edema was measured by micrometer 4 hours after the carrageenin administration and was compared with the control group. It was observed that each compound tested had appreciable effect of inhibiting or suppressing the development of edema. The results obtained are tabulated in the following table.

| Test compound: | Carrageenin edema inhibitory effect of test compound (percent inhibition) |
|---|---|
| 1-oxy-3-benzal-6-methyl-thiochromanone | 5.8 |
| 1-oxy-3-benzal-6-chloro-thiochromanone | 31.3 |
| 1-oxy-3-(p-methyl-benzal)-thiochromanone | 30.4 |
| 1-oxy-3-(o-chloro-benzal)-thiochromanone | 17.0 |
| 1-oxy-3-(m-chloro-benzal)-thiochromanone | 20.5 |
| 1-oxy-3-(p-chloro-benzal)-thiochromanone | 18.0 |
| 1-oxy-3-(o-bromo-benzal)-thiochromanone | 4.2 |

The fact that the compounds of the present invention have the effect of inhibiting the edema indicates that the compounds of the present invention also have the anti-inflammatory effect useful to treat the inflammation which occurs in various tissues organs in the body of animals as well as human beings.

Acute toxicity was tested 500 mg./kg. of 1-oxy-3-benzal-6-chloro-thiochromanone suspended in 5% gum arabic was administered intraperitoneally to male mice weighing 19.5 to 20.5 g. This compound was almost nontoxic. After injection, the only effect observed was slight to moderate decrease in spontaneous motor activity.

What we claim is:

1. 1-oxy-3-benzal-thiochromanone derivative having the following formula:

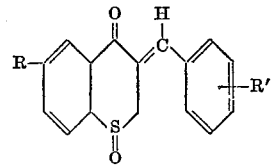

wherein R stands for a hydrogen atom, halogen atom, or an alkyl group of 1 to 4 carbon atoms; and R' stands for a hydrogen atom, a halogen atom, or a cyano group or an alkyl group of 1 to 4 carbon atoms.

2. 1-oxy-3-benzal-6-chloro-thiochromanone.
3. 1-oxy-3-(p-methyl-benzal)-thiochromanone.
4. 1-oxy-3-(o-chloro-benzal)-thiochromanone.
5. 1-oxy-3-(m-chloro-benzal)-thiochromanone.
6. 1-oxy-3-(p-chloro-benzal)-thiochromaone.
7. A process for the production of 1-oxy-3-benzal-thiochromanone derivative of the following formula:

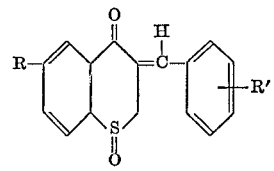

wherein R stands for a hydrogen atom, a halogen atom, or an alkyl group of 1 to 4 carbon atoms; and R' stands for a hydrogen atom, a halogen atom, or a cyano group or an alkyl group of 1 to 4 carbon atoms, which comprises subjecting the corresponding 3-benzal-thiochromanone derivative to oxidation in the presence of an oxidizing agent to convert said 3-benzal-thiochromanone derivative to said 1-oxy-3-benzal-thiochromanone derivative.

8. A process as claimed in claim 7 in which the oxidation is effected by reacting the starting 3-benzal-thiochromanone derivative with aqueous hydrogen peroxide in the presence of an inert organic liquid in which the starting material may be dissolved or suspended.

References Cited

Nambara et al.: J. Pharm. Soc., Japan, vol. 81, pp. 1 to 7 (1961).

Nishio, Chem. Pharm. Bull. (Tokyo), vol. 17, pp. 274–8 (February 1969).

JOHN D. RANDOLPH, Primary Examiner

U.S. Cl. X.R.

424—275; 260—327 TH